Aug. 10, 1926.  1,595,785
P. S. JACKSON
METHOD OF AND APPARATUS FOR COUNTERBALANCING UNBALANCING FORCES
OF THE RECIPROCATING PARTS OF RECIPROCATING ENGINES
Filed March 10, 1924    3 Sheets-Sheet 2
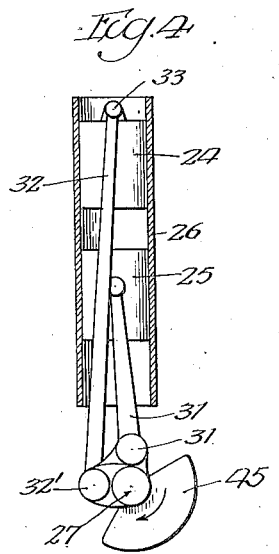
Fig.4
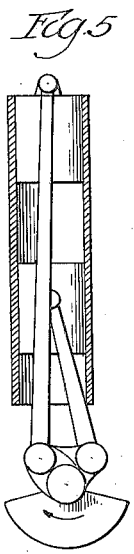
Fig.5
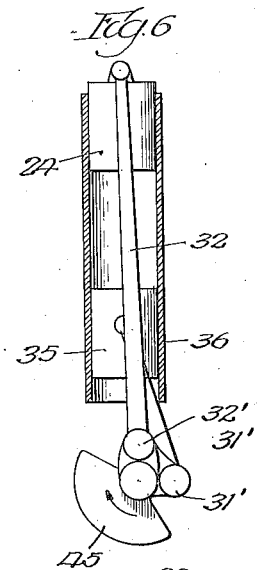
Fig.6
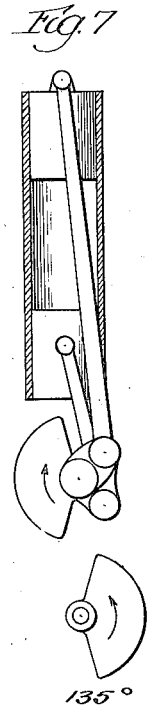
Fig.7
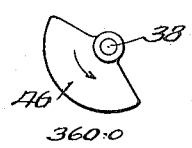
360°
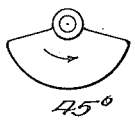
45°
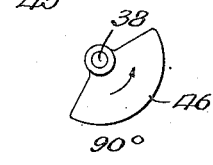
90°
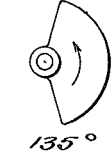
135°
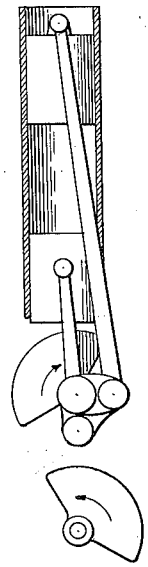
Fig.8
180°
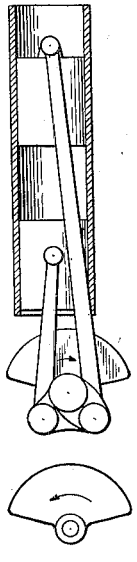
Fig.9
225°
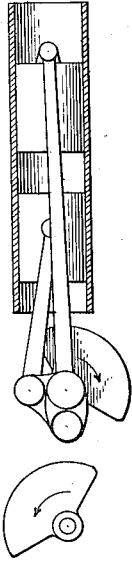
Fig.10
270°
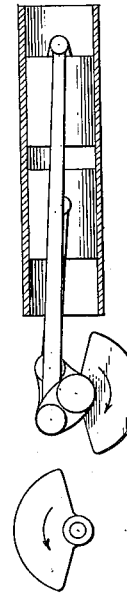
Fig.11
315°

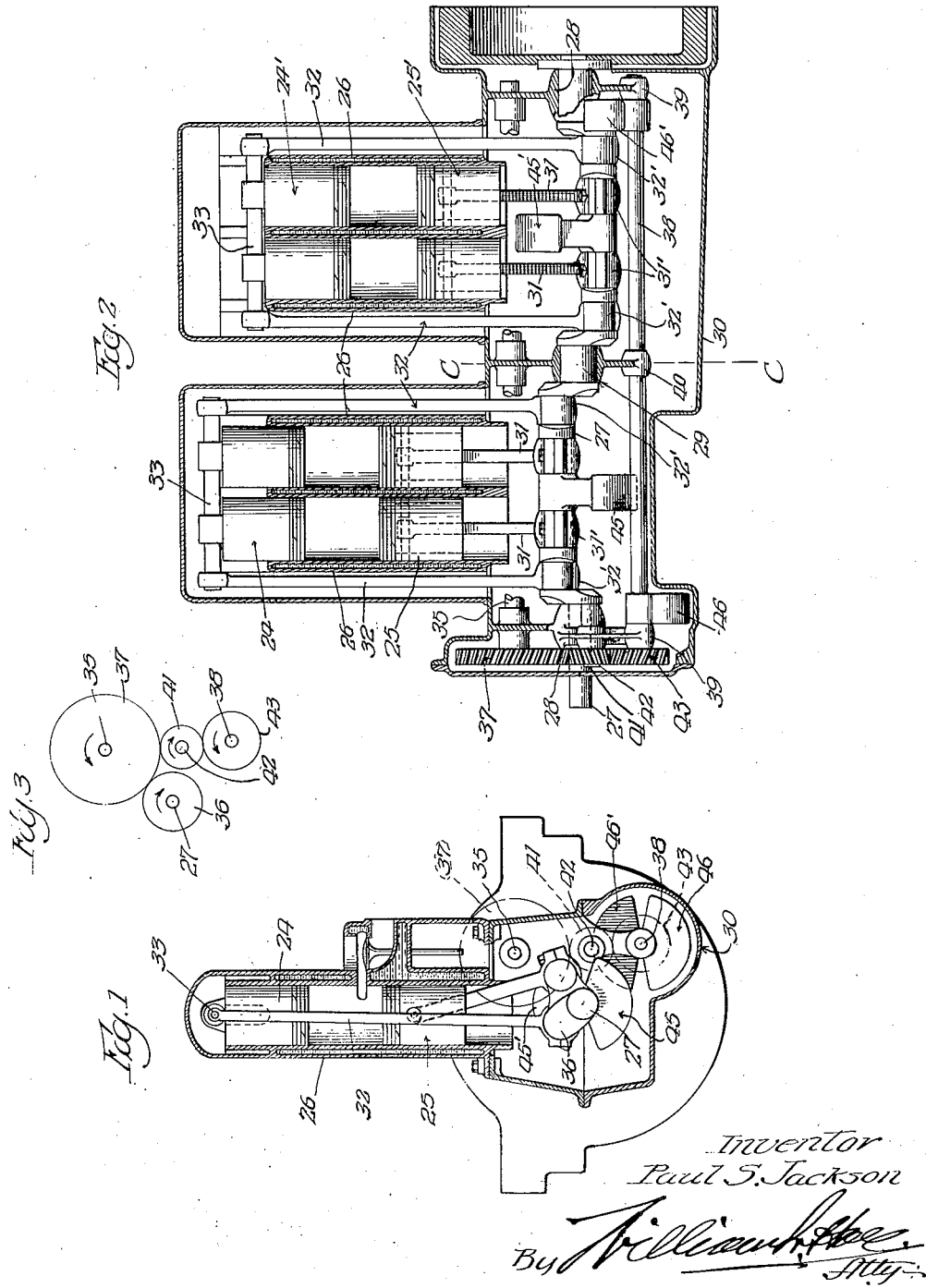

Aug. 10, 1926. 1,595,785
P. S. JACKSON
METHOD OF AND APPARATUS FOR COUNTERBALANCING UNBALANCING FORCES
OF THE RECIPROCATING PARTS OF RECIPROCATING ENGINES
Filed March 10, 1924 3 Sheets-Sheet 3
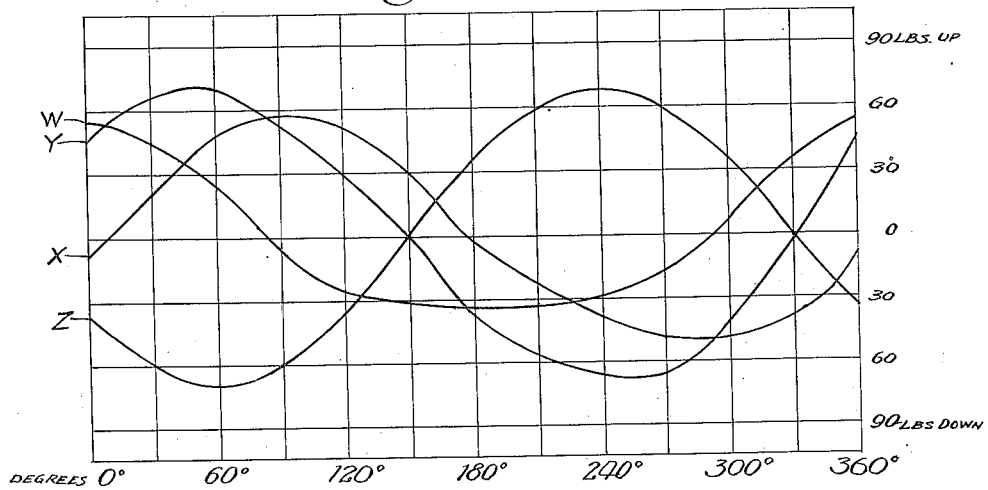
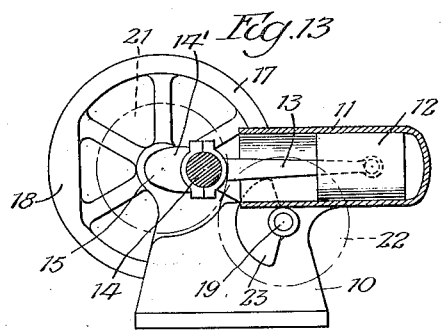
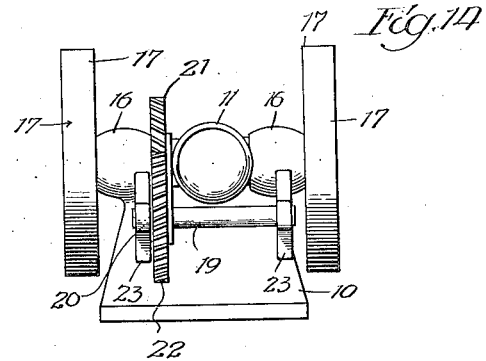
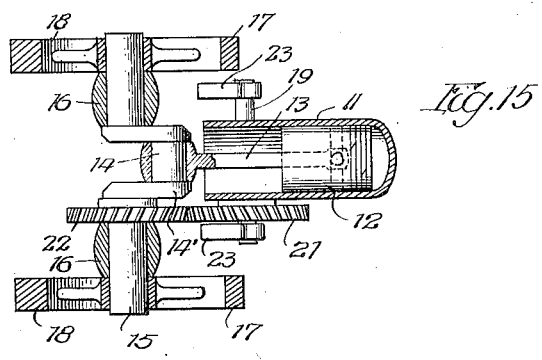

Patented Aug. 10, 1926.

1,595,785

UNITED STATES PATENT OFFICE.

PAUL S. JACKSON, OF ROCKFORD, ILLINOIS, ASSIGNOR TO THE JACKSON PETROLEUM MOTOR COMPANY, OF AUGUSTA, MAINE, A CORPORATION OF MAINE.

METHOD OF AND APPARATUS FOR COUNTERBALANCING UNBALANCING FORCES OF THE RECIPROCATING PARTS OF RECIPROCATING ENGINES.

Application filed March 10, 1924. Serial No. 698,342.

This invention relates to a method of and an apparatus for diminishing vibrations resulting from primary unbalance of the reciprocating parts of reciprocating engines. Primary unbalance may be interpreted as the free force, parallel to the cylinder, that exists in an engine due to acceleration and deceleration of the reciprocating parts. In a vertical engine, for example (assuming the revolving parts to be properly balanced), the maximum upward unbalance would be manifested as the piston passed over top dead center, and the maximum downward unbalance would be manifested as the piston passed over bottom dead center. Two neutral points would thus be manifested, where no unbalance exists, and which would be approximately ninety degrees between top and bottom dead centers.

Such primary unbalance is very disadvantageous in single cylinder engines, and also multiple cylinder engines that have cranks arranged in such a way that rocking couples are introduced. A rocking couple would exist in a two cylinder vertical engine, when the cranks are set opposite to each other, by reason of the downward force in one cylinder being displaced at a certain distance from the upward force in the other cylinder. A rocking couple could also exist in a four cylinder engine of the dual piston type, with cranks of the upper pistons set ninety degrees, or substantially ninety degrees, from the cranks of the lower pistons, where the front pistons work as pairs one hundred eighty degrees from the rear pistons.

It has been common in prior practice to balance the revolving parts of an engine by counterweights or other revolving parts. This can be accomplished by care in construction; but the reciprocating parts can only be partly balanced by such a method. A common procedure, which has been followed, is to counterbalance one-half the weight of the reciprocating parts, as by attaching a weight to the crank shaft opposite to the crank pin, whose moment is equal to one-half of the concentrated weight on the crank pin of the piston, piston pin, rings, and that portion of the connecting rod that is considered reciprocating.

In a vertical engine, for example, the centrifugal force of the counterweight would pull down on a crank shaft and engine frame, while the piston would pull upward in passing its top dead center, and vice versa when the pin is at its bottom dead center. This has the effect to diminish the vertical primary unbalance parallel to the cylinder by one-half but has the disadvantage of introducing a transverse unbalance, due to the centrifugal force of the counterweight, when the moving crank is approximately ninety degrees from the top and bottom dead centers.

It is the purpose of the present invention to provide a method and an apparatus for carrying it into effect, whereby the total amount of the primary unbalance may be effectually balanced by utilizing the centrifugal force of crank shaft counterweights and introducing a separate shaft, which may be termed a compensator or stabilizing shaft, with weights thereon to complete the balance of the remaining one-half of the weight of the reciprocating parts.

My method of balance embraces the use of revoluble masses which are caused to rotate at the same speed as the crank shaft, but in the opposite direction, and the apparatus herein shown for practicing said method comprises in combination with the crank shaft and counterweights carried thereby and revoluble therewith, of an auxiliary shaft rotatably mounted in bearings and driven from the crank shaft by suitable gearing, said auxiliary shaft extending parallel to the crank shaft and itself and the weights carried thereby driven at the same speed as the crank shaft and its weights, but in the opposite direction. The shaft carrying said weights is hereinafter termed the compensator or stabilizing shaft.

This compensator or stabilizing shaft may be disposed in an engine in the same manner as the conventional cam shaft or auxiliary shaft, parallel with and at the point of the longitudinal center of gravity of the engine. The timing gearing of this compensator shaft is to be adjusted so that, for example, when the maximum force of the reciprocating parts are thrown upward, as the piston is passing its top dead center, the centrifugal force of the crank shaft counterweight and that of the compensator weight will be moving downward in a complemental path. In this position the two counterweight forces are added together, with their sum opposing the inertia force of the reciprocating mass. Also in the ninety degree position between top and bottom dead centers, where the forces of the reciprocating parts are changing direction, the crank shaft counterweights are opposed by the compensator shaft counter weights, due to the opposite rotation, and therefore no transverse unbalanced force will be found to exist.

In the drawings:

Figure 1 is a sectional view at a right angle to the engine shaft, with parts in elevation, of a four cylinder dual piston type of engine, with two pistons operating in a single cylinder and connected to said crank shaft showing the application of my invention thereto.

Figure 2 is a sectional view of said engine taken in a plane parallel to said crank shaft.

Figure 3 is a diagrammatic illustration of the gearing connecting the crank shaft to the compensator shaft.

Figures 4 to 11, both inclusive, illustrate the adaptation of my improvements to the dual piston engine, showing the two pistons of a single cylinder in the relative portions which they occupy in eight stages of movement of the pistons.

Figure 12 is a diagram delineating the forces acting parallel to the cylinders at various crank positions at a given speed with given piston weights.

Figure 13 is a part side and part section elevation of a single cylinder engine showing the embodiment of my invention thereto.

Figure 14 is an end view of said single cylinder engine.

Figure 15 is a horizontal section thereof.

First referring to the construction shown in Figures 13, 14 and 15 delineating in a diagrammatic way a conventional horizontal type of stationary engine, with my improvements adapted thereto, 10 designates the base of the engine; 11, the horizontal cylinder; 12, the piston therein; 13, the piston rod which connects the piston to the crank pin 14 carried by the crank arms 14' of the crank shaft 15 which is mounted to rotate in suitable bearing 16 carried by the base. The crank shaft 15, as herein shown, carries two balance or fly wheels 17, with counterweights 18 cast integral with the rims thereof, and which, in addition to counterbalancing the weight of the revolving parts, together produce a moment opposite to and counterbalances the movement produced by one-half of the weight of the reciprocating parts concentrated around the crank pin.

19 designates the compensator shaft. It is mounted to rotate in suitable bearings carried by the engine frame. Said shaft 19 is geared to the crank shaft 15 through the medium of meshing gears 21, 22, herein shown and preferably of the spiral type. Said shaft 19 carries at its ends counterweights 23 which are fixed to and rotate with said latter shaft. The sum of the moments of said counterweights 23 is equal to that of the counterweights 18. The gears 22, 21 on the crank and compensator shafts 15 and 19, respectively, are so proportioned as to transmit equal speed from the crank shaft to said compensator shaft, thus giving to the revolving weights 23 the same periodicity as the weights 18. Therefore, when the engine is in operation, the said compensator shaft weights 23 are so timed relatively to the counterweights 18 as to neutralize the forces, to which the primary vibrations in an engine of this type, are due.

It has been found that the adaptation of my apparatus to an engine of this type serves to effectually cancel out or balance the rocking or shaking motion of the engine due to the primary unbalance of the reciprocating parts.

The type of engine shown in Figures 1 and 2, and the operation of which is diagrammatically illustrated in Figures 4 to 11, both inclusive, closely follows the construction set forth in the prior United States Letters Patent to Jackson, No. 1,191,311, in that there are two pistons in each cylinder 26; the pistons in one pair, or the front pair of cylinders being designated by 24, 25, and the pistons in the other or rear pair of cylinders being designated by 24' 25'. The engine shown in Figures 1 and 2 is a vertical, four cylinder engine, and the crank shaft 27 is arranged beneath the cylinders and mounted to rotate in end and intermediate bearings 28, 29 in a crank case 30. The lower pistons 25, 25' are connected by connecting rods 31 to the pins 31' of said crank shaft, and the upper pistons 24, 24' are connected through longer connecting rods 32 to the pins 32' of said crankshaft, through the medium of long piston pins 33 suitably connected to oscillate in the upper ends of two adjacent pistons 24, 24'. When the invention is adapted to an explosion engine, the crank shaft is connected to the usual cam shaft 35 through a pinion 36 on the crank shaft and a gear 37 on said cam shaft.

In the adaptation of my improvements to this type of engine, there is provided beneath the crank shaft, parallel to and near the longitudinal center of gravity of said engine, within the crank case 30, a compensator shaft 38 mounted in suitable end and intermediate bearings 39, 40. For convenience, said compensator shaft is below and at one side of the crank shaft. It is driven from the crank shaft through a train of gears embracing an idler gear 41 fixed to a shaft 42 that rotates in a bearing carried by the crank case, meshing with the cam shaft gear 37 and with a gear 43 that is fast on the compensator shaft 38 within the crank casing. In the construction shown in said Figure 2, the pistons of the rear pair of cylinders are disposed at 180 degrees from the pistons of the front pair of cylinders, assuming the front pair of cylinders to be those at the left hand side of the figure. In such construction, it would be possible to gear the compensator shaft direct to the crank shaft gear, but for convenience in this instance and to give clearance for the rotation of the counterweights, hereinafter to be mentioned, said compensator shaft is driven from the cam shaft gear through the idler gear 41.

45, 45' designate revoluble counterweights located one beneath each pair of cylinders and set on the crank shaft 180 degrees apart. 46, 46' designate other counterweights fixed to and revoluble with the compensator shaft 38 and also set at 180 degrees apart, said counterweights being herein shown as located near the ends of the latter shaft or adjacent to its end bearings.

In Figures 1 and 2 the engine parts are shown in a position of maximum unbalance, with the pistons of the front cylinders exerting an upward force and the corresponding counterweights 45, 46 exerting a combined equal and opposing downward force, while the pistons at the rear end of the engine exert a downward force opposing a combined equal upward force of their corresponding counterweights 45', 46'.

The moment of the counterweight 45 on the crank shaft 27, in addition to counterbalancing the weight of the revolving portions, counterbalances the moment produced by one-half the weight of the reciprocating portions, concentrated around their respective crank pins. That is to say, the moment of counterweight 45, aside from counterbalancing the revolving portions, exerts a resultant force equal and opposite to the moments determined by the concentrated weight of one-half of said reciprocating portions, including the reciprocating portions of connecting rods 33 on crank pin 32', and the concentrated weight of one-half of the reciprocating portions, including the reciprocating portions of connecting rods 33 on the crank pins 31'. The conditions described as prevailing at the front of the engine are opposite to conditions that are simultaneously prevailing at the rear of the engine.

The counterweights 46, 46' are equal in moment to the portions of counterweights 45, 45' that represent the resultant moment of the reciprocating parts alone. By placing the counterweights 46, 46' farther from the transverse center of the engine, shown in Figure 2, and indicated by the line C—C, than the counterweights 45, 45', they have greater lever advantage, due to the rocking couple caused by the opposed movements of the front and rear reciprocating parts about the said common center. Therefore, their total weights are less than, but their moments are the same as that portion of, the counterweights 45, 45' that represents the resultant moment of the reciprocating parts.

Figures 4 to 11, inclusive, show the relative positions of the two pistons of a single cylinder and the opposing counterweights throughout one cycle of the engine, graduated by steps of 45 degrees.

In Figure 12 is an inertia force diagram which graphically indicates the forces acting parallel to the cylinder at various crank positions at a given speed, with given piston weights; and it is designed to illustrate such forces throughout the cycle indicated in Figures 4 to 11 inclusive. It may be assumed that in said diagram, the line W represents the inertia force of the lower piston starting at its maximum upward direction; that the line X represents the inertia force of the upper piston in its instantaneous relative position to said lower piston; that line Y is the resultant of these two forces and that line Z is the vertical component of that portion of the weight on the crank shaft that equals one-half the weight of the reciprocating parts together with the weight on the compensator shaft. This vertical component varies in value as the forces of the two counterweights approach and recede from each other.

Said diagram may be considered to start from the position shown in Figure 4, with the lower piston at its top dead center. At this point the inertia force of the lower piston is in its maximum upward direction, as indicated by the line W on the diagram, and the line X indicates the inertia force of the upper piston in the position shown in Figure 4, while as stated the line Y is the resultant of these two inertia forces.

Figures 5 and 9 show the centrifugal forces of both counterweights at their maximum where they, together, oppose the maximum inertia force of the reciprocating masses. Figures 4, 6, 8 and 10 show the counterweights offset at the sides of the vertical. Therefore their vertical component is lessened as shown in Figure 12. Figures 7 and 11 show the positions of the reciprocating and revolving masses at positions where the revolving counterweights oppose each other and where practically no unbalance exists in the engine due to reciprocating parts.

This arrangement produces a very smooth running engine, as it can be readily seen that line Z is practically at all points equal and opposite to line Y on the diagram shown in Figure 12.

I claim as my invention:

1. The combination with an engine, including its piston, its crank shaft and its connecting rod, of a compensator shaft geared to and rotating at equal speed with said crank shaft and in an opposite direction, and revolving counterweight masses of equal moment connected to said shafts, the compensator shaft mass being spaced along the length of its shaft to increase the lever advantage of the latter masses.

2. A multi-cylinder, dual-piston engine, embracing a front and a rear pair of cylinders, with the pistons of each cylinder connected to crank shaft pins spaced at ninety degrees apart, and with the corresponding pistons of each pair of cylinders connected to crank shaft pins spaced at one hundred and eighty degrees apart, of a compensator shaft geared to said crank shaft to rotate at an equal speed therewith and in opposite direction thereto, and a pair of revoluble weights fixed to each of said shafts, said weights being symmetrically disposed with respect to a transverse plane located midway between the pairs of cylinders.

3. A multi-cylinder, dual-piston, vertical engine, embracing a front and a rear pair of cylinders, with the upper and lower pistons of the cylinders of each pair spaced at ninety degrees apart on the crank shaft, and with corresponding pistons of each pair of cylinders spaced at one hundred and eighty degrees apart on the crank shaft, of compensator weights driven by said crank shaft at equal speed and opposite directions.

4. The combination with an engine, including its piston, its crankshaft and its connecting rod, of a compensator shaft geared to and rotating at equal speeds with said crank shaft and in an opposite direction, and revolving counterweight masses disposed opposite each other and spaced a substantial distance along said shaft to increase the lever advantage of said masses.

5. A multi-cylinder, dual-piston engine, embracing a front and rear pair of cylinders, with the pistons of each cylinder connected to crank shaft pins spaced at ninety degrees apart, and with the corresponding pistons of each pair of cylinders connected to crankshaft pins spaced at one hundred eighty degrees apart, of a compensator shaft geared to said crankshaft to rotate at an equal speed therewith and in opposite directions thereto, both said shafts having revoluble weights attached thereto, corresponding weights of both shafts acting as pairs in conjunction with their respective cylinders.

6. Means for counteracting vibrations resulting from primary unbalancing forces of the reciprocating parts of a reciprocating engine, comprising in combination with the engine crank shaft, a single compensator shaft geared to said crank shaft to rotate at an equal speed therewith and in an opposite direction therefrom, and a plurality of counterweight masses connected to and revolving with each of said shafts, said counterbalancing masses being symmetrically disposed with respect to a plane at right angles to said shafts and located at approximately the longitudinal center of the engine.

In witness whereof I claim the foregoing as my invention, I hereunto append my signature this 19th day of February, 1924.

PAUL S. JACKSON.